US011923597B2

(12) United States Patent
Wu et al.

(10) Patent No.: US 11,923,597 B2
(45) Date of Patent: Mar. 5, 2024

(54) ANTENNA STRUCTURE AND ELECTRONIC DEVICE

(71) Applicant: WISTRON NEWEB CORPORATION, Hsinchu (TW)

(72) Inventors: Meng-Kai Wu, Hsinchu (TW); Hong-Jun Jian, Hsinchu (TW)

(73) Assignee: WISTRON NEWEB CORPORATION, Hsinchu (TW)

( * ) Notice: Subject to any disclaimer, the term of this patent is extended or adjusted under 35 U.S.C. 154(b) by 17 days.

(21) Appl. No.: 17/834,002

(22) Filed: Jun. 7, 2022

(65) Prior Publication Data

US 2023/0216177 A1 Jul. 6, 2023

(30) Foreign Application Priority Data

Jan. 3, 2022 (TW) ................................ 111100008

(51) Int. Cl.

| | |
|---|---|
| ***H01Q 1/22*** | (2006.01) |
| ***H01Q 1/38*** | (2006.01) |
| ***H01Q 5/371*** | (2015.01) |
| ***H01Q 5/392*** | (2015.01) |
| ***H01Q 9/42*** | (2006.01) |

(52) U.S. Cl.
CPC ............ *H01Q 1/2266* (2013.01); *H01Q 1/38* (2013.01); *H01Q 5/371* (2015.01); *H01Q 5/392* (2015.01); *H01Q 9/42* (2013.01)

(58) Field of Classification Search
CPC .. H01Q 1/2291; H01Q 1/2258; H01Q 1/2266; H01Q 1/243; H01Q 1/38; H01Q 5/357; H01Q 5/364; H01Q 5/371; H01Q 5/378; H01Q 5/385; H01Q 5/392; H01Q 9/42; H01Q 21/28; H01Q 21/30
See application file for complete search history.

(56) References Cited

U.S. PATENT DOCUMENTS

2010/0315294 A1 12/2010 Chang et al.
2013/0021209 A1 * 1/2013 Fan ....................... H01Q 5/371
343/700 MS

FOREIGN PATENT DOCUMENTS

CN 102709672 A * 1/2012

* cited by examiner

*Primary Examiner* — Robert Karacsony
(74) *Attorney, Agent, or Firm* — McClure, Qualey & Rodack, LLP

(57) ABSTRACT

An electronic device is provided. The electronic device includes an antenna structure and a housing. The antenna structure includes a first radiating element, a grounding element, and a second radiating element. The first radiating element includes a first radiating portion and a grounding portion. Two ends of the grounding portion are respectively connected with the first radiating portion and the grounding element. The first radiating portion, the grounding portion and the grounding portion form a surrounding structure. The second radiating element includes a second radiating portion, a third radiating portion, a fourth radiating portion, and a feeding portion connected between the second radiating portion, the third radiating portion and the fourth radiating portion. The second radiating portion and the first radiating portion are separated from each other and couple to each other.

12 Claims, 6 Drawing Sheets

ANTENNA STRUCTURE AND ELECTRONIC DEVICE

CROSS-REFERENCE TO RELATED PATENT APPLICATION

This application claims the benefit of priority to Taiwan Patent Application No. 111100008, filed on Jan. 3, 2022. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to an electronic device, and more particularly to an electronic device with an antenna structure covering multiple frequency bands.

BACKGROUND OF THE DISCLOSURE

With the development being made in mobile communication technology, mobile devices such as laptops, smart phones, and other hybrid functional portable electronic devices have become more common. To satisfy user demand, mobile devices can usually perform wireless communication functions. Some devices cover a long range wireless communication area, such as 2G, 3G, and LTE (Long Term Evolution) systems and some devices cover a short range wireless communication area, such as Wi-Fi for communication.

For the portability of the electronic device, the appearance size of the electronic device is designed to be miniaturized, so that the space for arranging the antenna on the small or portable electronic device is very limited. Therefore, how to design an antenna structure capable of transmitting and receiving multiple wireless frequency bands at the same time and having good antenna efficiency in the electronic device and the limited internal space is an important issue in the art.

SUMMARY OF THE DISCLOSURE

In response to the above-referenced technical inadequacies, the present disclosure provides an electronic device with an antenna structure capable of covering multiple frequency bands in view of the deficiencies of the prior art, so as to take into account the miniaturized design of the electronic device and maintain good antenna efficiency.

In one aspect, the present disclosure provides an antenna structure, which includes a first radiating element, a grounding element, and a second radiating element. The first radiating element includes a first radiating portion and a grounding portion. The first radiating portion is connected to one end of the grounding portion. The grounding portion is connected to another end of the grounding portion. The first radiating portion, the grounding portion and the grounding element form a surrounding structure. The second radiating element includes a second radiating portion, a third radiating portion, a fourth radiating portion, and a feeding portion connected between the second radiating portion, the third radiating portion and the fourth radiating portion. The feeding portion is connected to a feeding element. The second radiating portion is disposed between the first radiating portion and the third radiating portion. The second radiating portion and the third radiating portion extend in a direction away from the grounding portion relative to the feeding portion. The fourth radiating portion extends in a direction toward the ground portion relative to the feeding portion. The fourth radiating portion is surrounded by the surrounding structure. The second radiating portion and the first radiating portion are separated from each other and couple to each other, so that the feeding portion, the second radiating portion, the first radiating portion and the grounding portion generate a first operating frequency band and a second operating frequency band. The first operating frequency band is different from the second operating frequency band.

In another aspect, the present disclosure provides an electronic device, which includes an antenna structure and a housing. The antenna structure includes a first radiating element, a grounding element, and a second radiating element. The first radiating element includes a first radiating portion and a grounding portion. The first radiating portion is connected to one end of the grounding portion. The grounding portion is connected to another end of the grounding portion. The first radiating portion, the grounding portion and the grounding element form a surrounding structure. The second radiating element includes a second radiating portion, a third radiating portion, a fourth radiating portion, and a feeding portion connected between the second radiating portion, the third radiating portion and the fourth radiating portion. The feeding portion is connected to a feeding element. The second radiating portion is disposed between the first radiating portion and the third radiating portion. The second radiating portion and the third radiating portion extend in a direction away from the grounding portion relative to the feeding portion. The fourth radiating portion extends in a direction toward the ground portion relative to the feeding portion. The fourth radiating portion is surrounded by the surrounding structure. The second radiating portion and the first radiating portion are separated from each other and couple to each other, so that the feeding portion, the second radiating portion, the first radiating portion and the grounding portion generate a first operating frequency band and a second operating frequency band. The first operating frequency band is different from the second operating frequency band. The housing is connected to the grounding element.

Therefore, in the antenna structure and the electronic device provided by the present disclosure, by virtue of "one end of the grounding portion being connected to the first radiating portion, and another end of the grounding portion being connected to the grounding element, so that the first radiating portion, the grounding portion and the grounding element form a surrounding structure" and "the second radiating portion and the first radiating portion being separated from each other and coupling to each other, so that the feeding portion, the second radiating portion, the first radiating portion and the grounding portion can generate a single path double resonance mode to cover the low frequency band," may cover a low frequency band.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
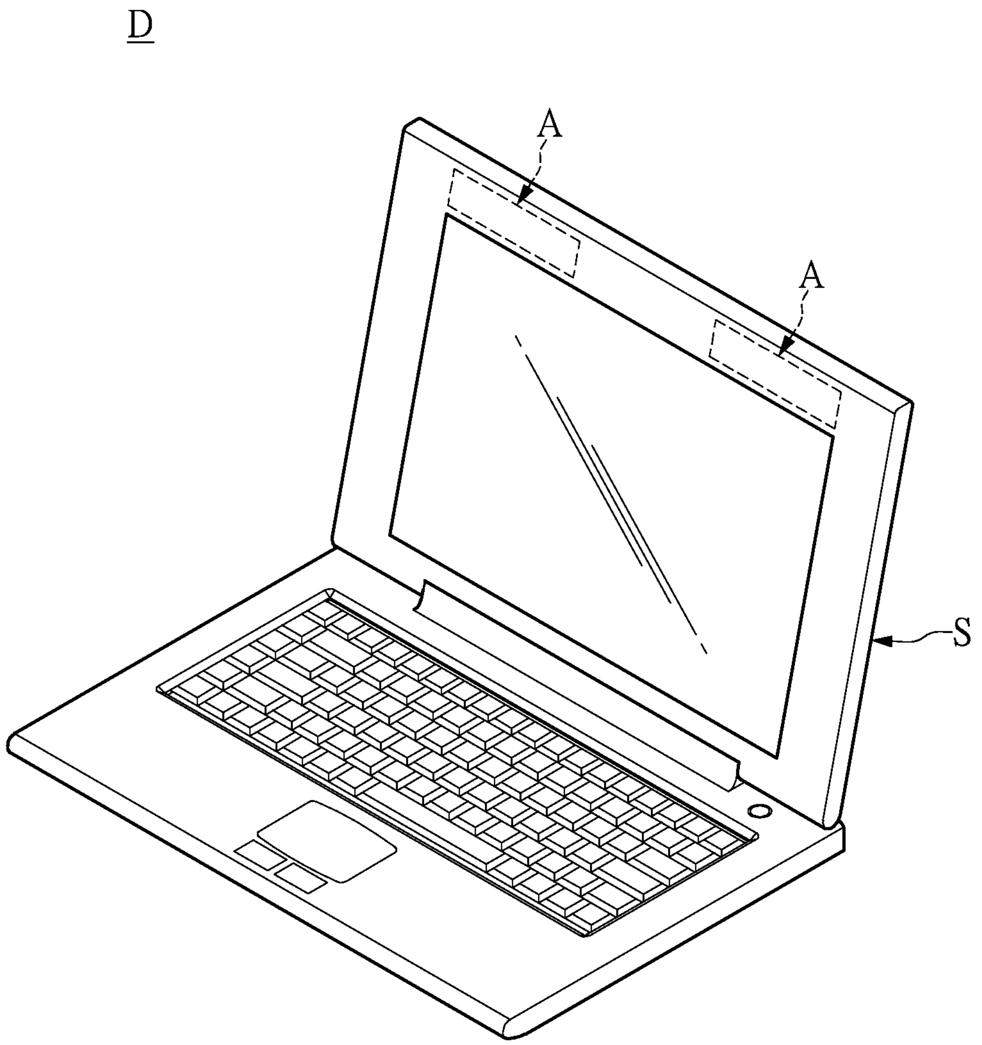
FIG. 1 is a schematic view of an electronic device of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like. In addition, the term "connect" used herein refers to a physical connection between two elements, which can be a direct connection or an indirect connection. The terms "couple" and "coupling to" used herein refers to two elements being separated and having no physical connection, and an electric field generated by a current of one of the two elements excites that of the other one.

First Embodiment

Referring to FIG. 1, an embodiment of the present disclosure provides an electronic device D. The electronic device D may have a function of transmitting and receiving radio frequency (RF) signals. For example, the electronic device D can be a smart phone, a tablet, or a laptop, but the present disclosure is not limited thereto. The present disclosure will take the electronic device D as a laptop as an example, but the present disclosure is not limited thereto. The electronic device D includes an antenna structure A and a housing S (the housing S may include a metal housing portion), the antenna structure A is arranged at the position of the screen frame of the electronic device D, and the electronic device D in FIG. 1 has two antenna structures A but the present disclosure is not limited to the number of the antenna structure A in FIG. 1. The electronic device D may generate at least one operating frequency band through the antenna structure A, but the present disclosure is not limited to this.

Figure 2:
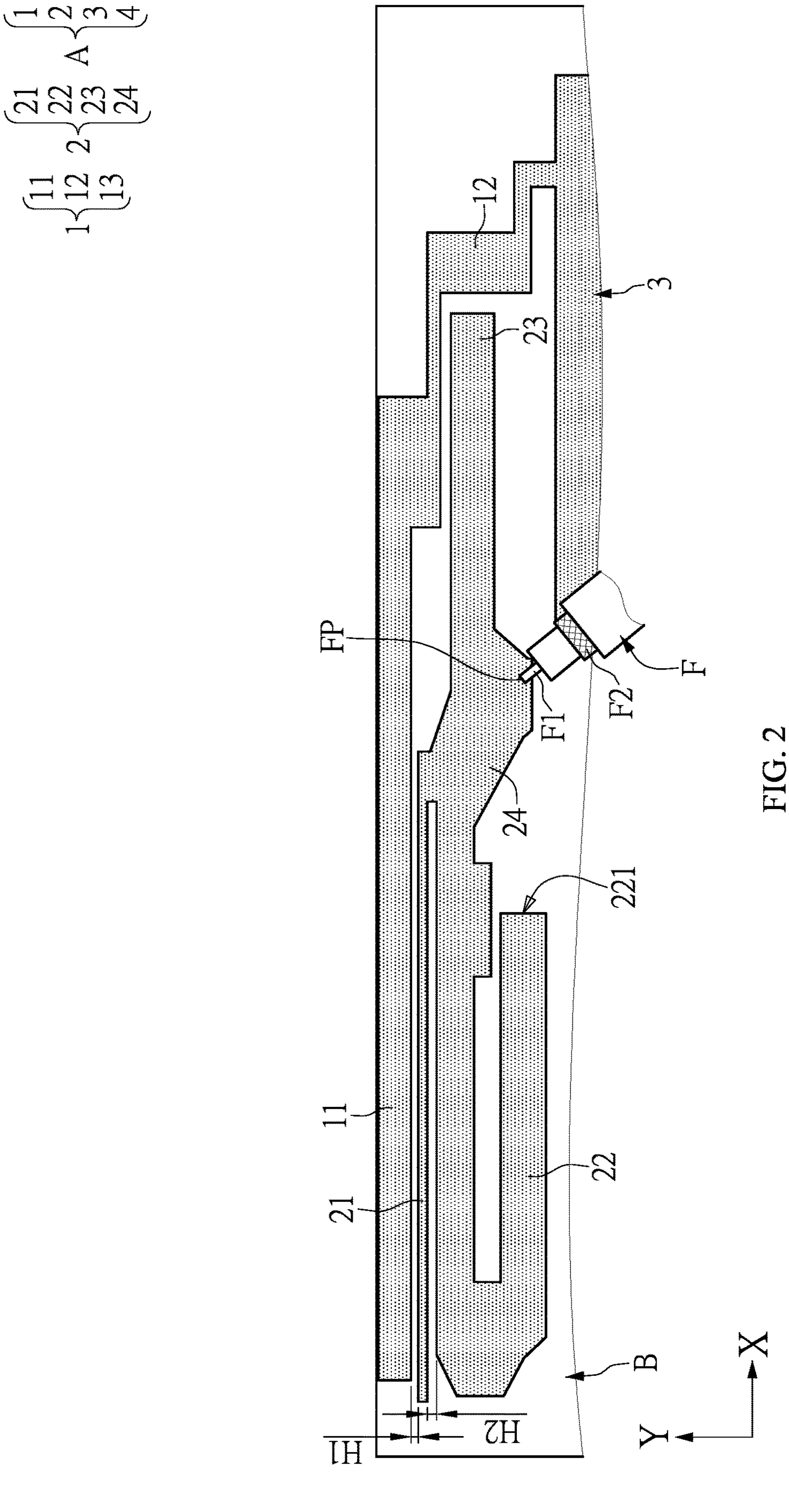
FIG. 2 is a plan schematic view of the antenna structure in a first embodiment of the present disclosure.

Next, referring to FIG. 1 and FIG. 2, FIG. 2 shows the antenna structure A of a first embodiment of the present disclosure. The antenna structure A is arranged on a carrier board B. The antenna structure A includes a first radiating element 1, a second radiating element 2 and a grounding element 3 connected to the housing S. The first radiating element 1 includes a first radiating portion 11 and a grounding portion 12. One end of the grounding portion 12 is connected to the first radiating portion 11 and another end of the grounding portion 12 is connected to the grounding element 3. The grounding element 3 is connected to the metal portion of the housing S. The first radiating portion 11, the grounding portion 12 and the grounding element 3 in FIG. 2 form a surrounding structure, which is basically in the shape of an inverted C shape.

Referring to FIG. 2, the second radiating element 2 includes a second radiating portion 21, a third radiating portion 22, a fourth radiating portion 23, and a feeding portion 24. The feeding portion 24 is connected between the second radiating portion 21, the third radiating portion 22 and the fourth radiating portion 23. The second radiating portion 21 and the third radiating portion 22 extend in a direction away from the grounding portion 12 (negative X-axis direction) relative to the feeding portion 24. The fourth radiating portion 23 extends in a direction (positive X-axis direction) toward the grounding portion 12 relative to the feeding portion 24. Therefore, it can be seen from FIG. 2 that the surrounding structure is formed by the first radiating portion 11, the grounding portion 12 and the grounding element 3, which surrounds the fourth radiating portion 23. The second radiating portion 21 and the third radiating portion 22 extend toward the outside of the surrounding structure (or away from the feeding portion 24) relative to the opening of the surrounding structure. The fourth radiating portion 23 extends toward the interior of the surrounding structure (or close to the grounding portion 12) relative to the opening of the surrounding structure. Further, the second radiating portion 21 is disposed between the first radiating portion 11 and the third radiating portion 22. The third radiating portion 22 extends in a direction away from the grounding portion 12 relative to the feeding portion 24 and then bends to form a hook-shaped structure, which makes an open end 221 of the third radiating portion 22 extend toward the ground portion 12 (positive X-axis direction).

As mentioned above, for example, the first radiating element 1, the second radiating element 2 and the grounding element 3 may be a metal sheet, a microstrip line, a metal wire or other conductors with conductive effect, but the present disclosure is not limited thereto. In addition, there is a first coupling gap H1 between the second radiating portion 21 and the first radiating portion 11. Preferably, the first coupling gap H1 is between 0.1 mm and 2 mm. The feeding portion 24 may be connected to a feeding element F, and the feeding element F may be, for example, but not limited to, a coaxial cable. The feeding element F has a feeding end F1 and a grounding end F2, the feeding element F is electrically connected to a feeding point FP on the feeding portion 24 through the feeding end F1, and is electrically connected to the grounding element 3 through the grounding end F2. Thereby, the feeding portion 24 may feed signals to the second radiating element 2 by connecting the feeding element F. In addition, the first radiating portion 11 and the second radiating portion 21 are separate from each other and couple to each other, so that the feeding portion 24, the second radiating portion 21, the first radiating portion 11 and the grounding portion 12 form an electrical path to the grounding element 3, and a dual resonance mode is excited by the electrical path to generate a first operating frequency band and a second operating frequency band. The first operating frequency band is different from the second operating frequency band.

Referring to FIG. 2, there is a second coupling gap H2 between the second radiation portion 21 and the third radiation portion 22. Preferably, the second coupling gap H2 is between 0.3 mm and 3 mm. Thereby, the second radiating portion 21 and the third radiating portion 22 couple to each other to generate a third operating frequency band. The third operating frequency band is higher than the second operating frequency band, and the second operating frequency band is higher than the first operating frequency band. In addition, the second radiating portion 21 may generate a fourth operating frequency band. The fourth radiating portion 23 may generate a fifth operating frequency band. The fifth operating frequency band is higher than the fourth operating frequency band.

Figure 5:
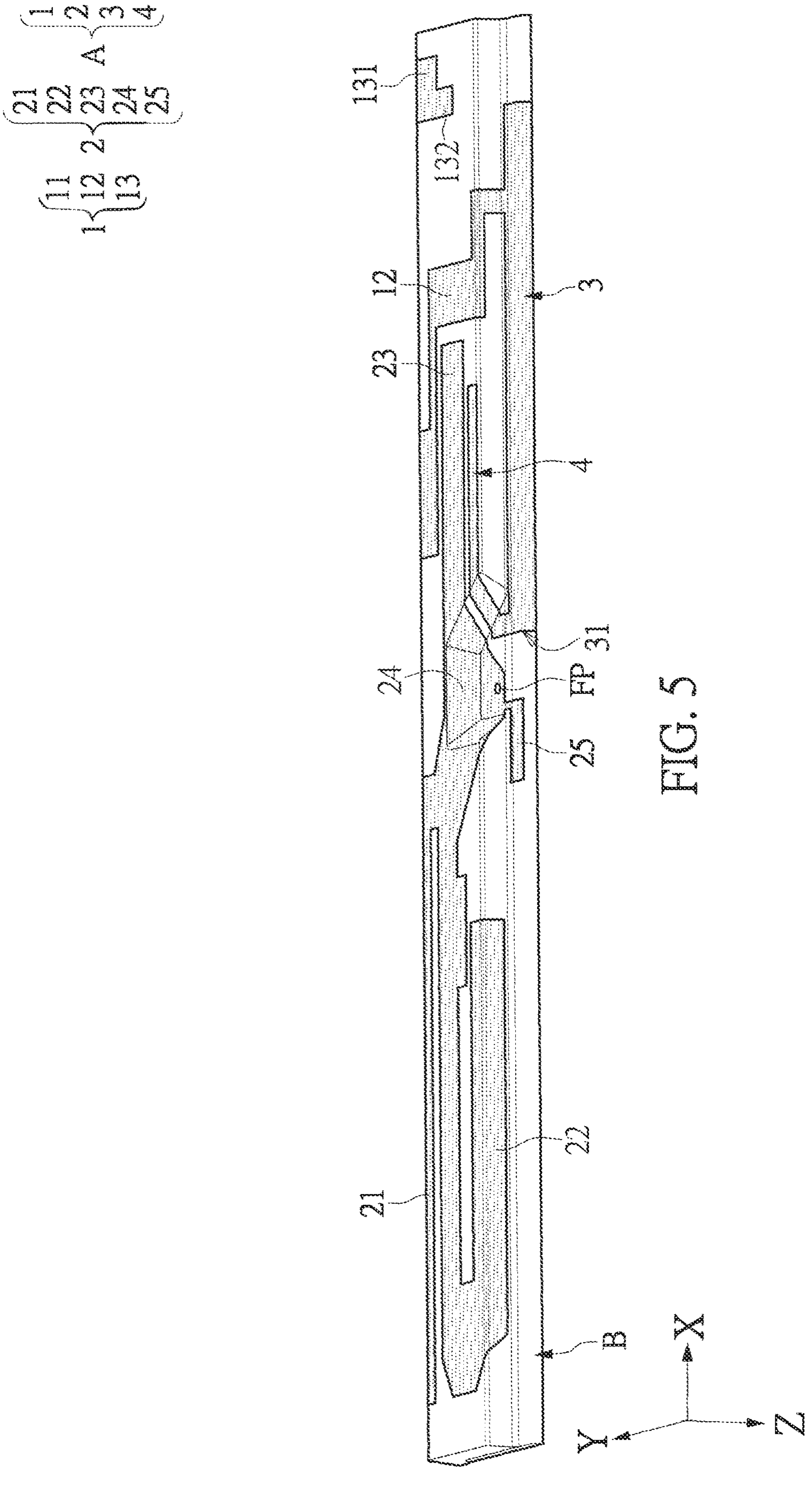
FIG. 5 is another schematic view of the antenna structure in the second embodiment of the present disclosure.

It should be noted that in FIG. 2, the range of the grounding element 3 may not cover the first radiating portion 11, the second radiating portion 21 and the third radiating portion 22 of the antenna structure A (or in other words, the grounding element 3 is only disposed on the right side of the feeding portion 24 and adjacent to the fourth radiating portion 23). Therefore, as shown in FIG. 5, a side edge 31 of the grounding element 3 is close to the feeding portion 24 (in FIG. 2, the position of the side edge 31 overlaps with the feeding element F) and is disposed on the right side of the feeding portion 24. However, the present disclosure is not limited to this. In other embodiments, the side edge 31 of the grounding element 3 close to the feeding portion 24 may extend to the left between the feeding point FP and an open end 221 of the third radiating portion 22, but not beyond the open end 221 to avoid the distance between the grounding element 3 and the third radiating portion 22 is too close to affect the impedance matching of the antenna structure A. Thereby, the first radiating portion 11, the second radiating portion 21 and the third radiating portion 22 may generate better frequency bandwidth and have good antenna efficiency without being affected by the grounding element 3.

Second Embodiment

Figure 3:
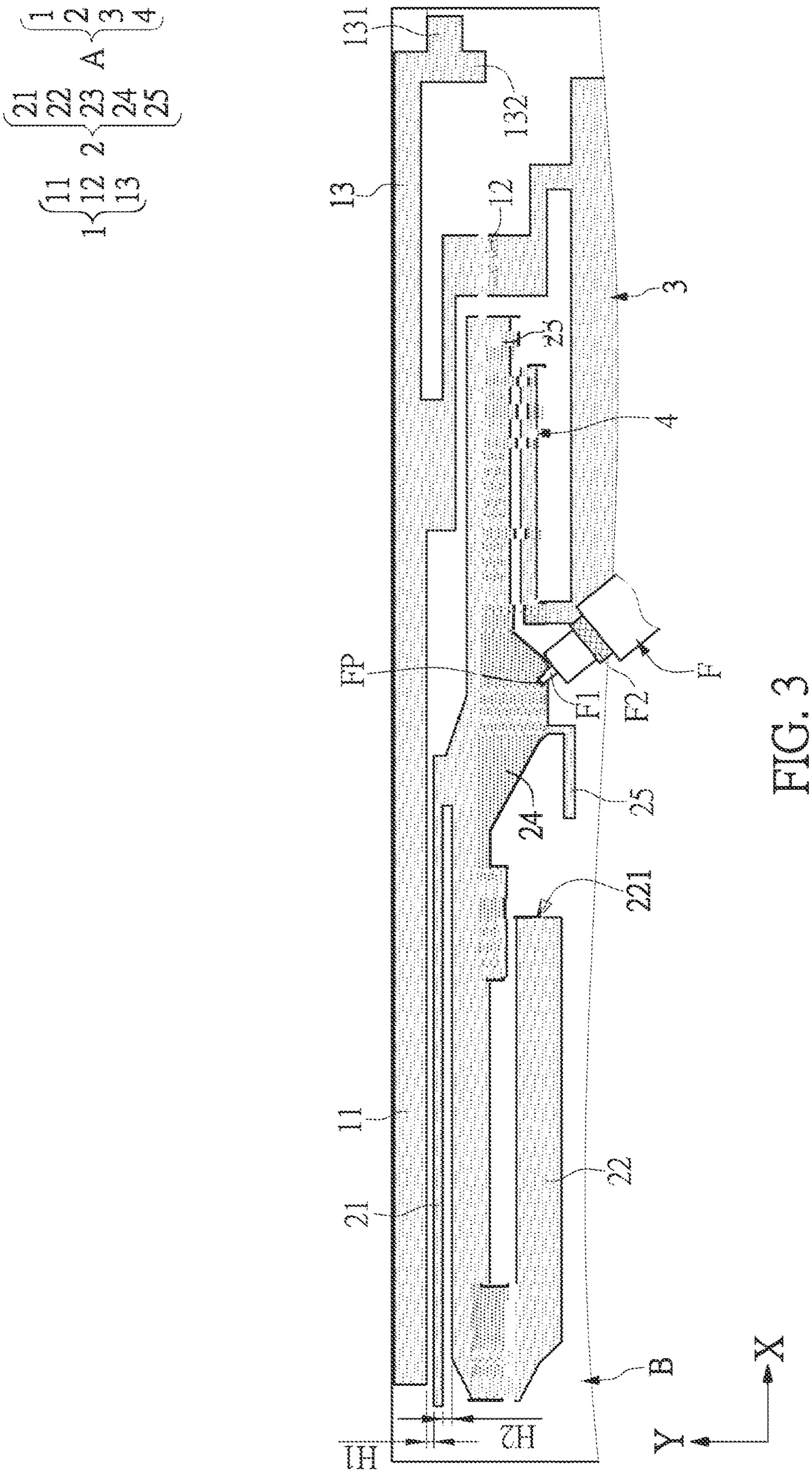
FIG. 3 is a plan schematic view of the antenna structure in a second embodiment of the present disclosure.

Referring to FIG. 3, FIG. 3 shows the antenna structure A of a second embodiment of the present disclosure. The antenna structure A of FIG. 3 has a structure similar to that of FIG. 2, and the similarities will not be repeated. To be more specific, in this embodiment, the first radiating element 1 of the antenna structure A not only includes the first radiating portion 11 and the grounding portion 12, but also includes a fifth radiating portion 13 connected between the first radiating portion 11 and the grounding portion 12. In addition, the second radiating element 2 of the antenna structure A of this embodiment not only includes the second radiating portion 21, the third radiating portion 22, the fourth radiating portion 23 and the feeding portion 24, but also includes a sixth radiating portion 25 connected to the feeding portion 24. In addition, the antenna structure A of this embodiment further includes a parasitic radiating element 4 connected to the grounding element 3.

As mentioned above, the fifth radiating portion 13 extends along the positive X-axis direction relative to the connection between the first radiating portion 11 and the grounding portion 12, and the first radiating portion 11 extends along the negative X-axis direction relative to the connection between the fifth radiating portion 13 and the grounding portion 12, so the extending direction of the fifth radiating portion 13 is opposite to the extending direction of the first radiating portion 11. Further, the feeding element F may feed signals to the fourth radiating portion 23 of the second radiating element 2 through the feeding portion 24, and then the fourth radiating portion 23 may couple to the grounding portion 12 and the fifth radiating portion of the first radiating element 1. Therefore, the fifth radiating portion 13 may generate a sixth operating frequency band and a seventh operating frequency band. The seventh operating frequency band is higher than the sixth operating frequency band. In addition, the fifth radiating portion 13 has a first branch 131 and a second branch 132, the first branch 131 extends along a first direction (positive X-axis direction), and the second branch 132 extends along a second direction (negative Y-axis direction) extends, and the first direction is perpendicular to the second direction. In this way, the present embodiment may utilize the dual branch structure of the fifth radiating portion 13 to increase the high frequency bandwidth of the antenna structure A (i.e., the bandwidths of the sixth operating frequency band and the seventh operating frequency band) and increase the antenna gain.

Referring to FIG. 3, the sixth radiating portion 25 and the parasitic radiating element 4 are generally L-shaped, the sixth radiating portion 25 extends toward the negative X-axis direction, and the parasitic radiating element 4 extends toward the positive X-axis direction, but the present disclosure is not limited. The sixth radiating portion 25 may generate an eighth operating frequency band, the parasitic radiating element 4 and the fourth radiating portion 23 are separate and couple to each other to generate a ninth operating frequency band, and the ninth operating frequency band is lower than the eighth operating frequency band.

Figure 4:
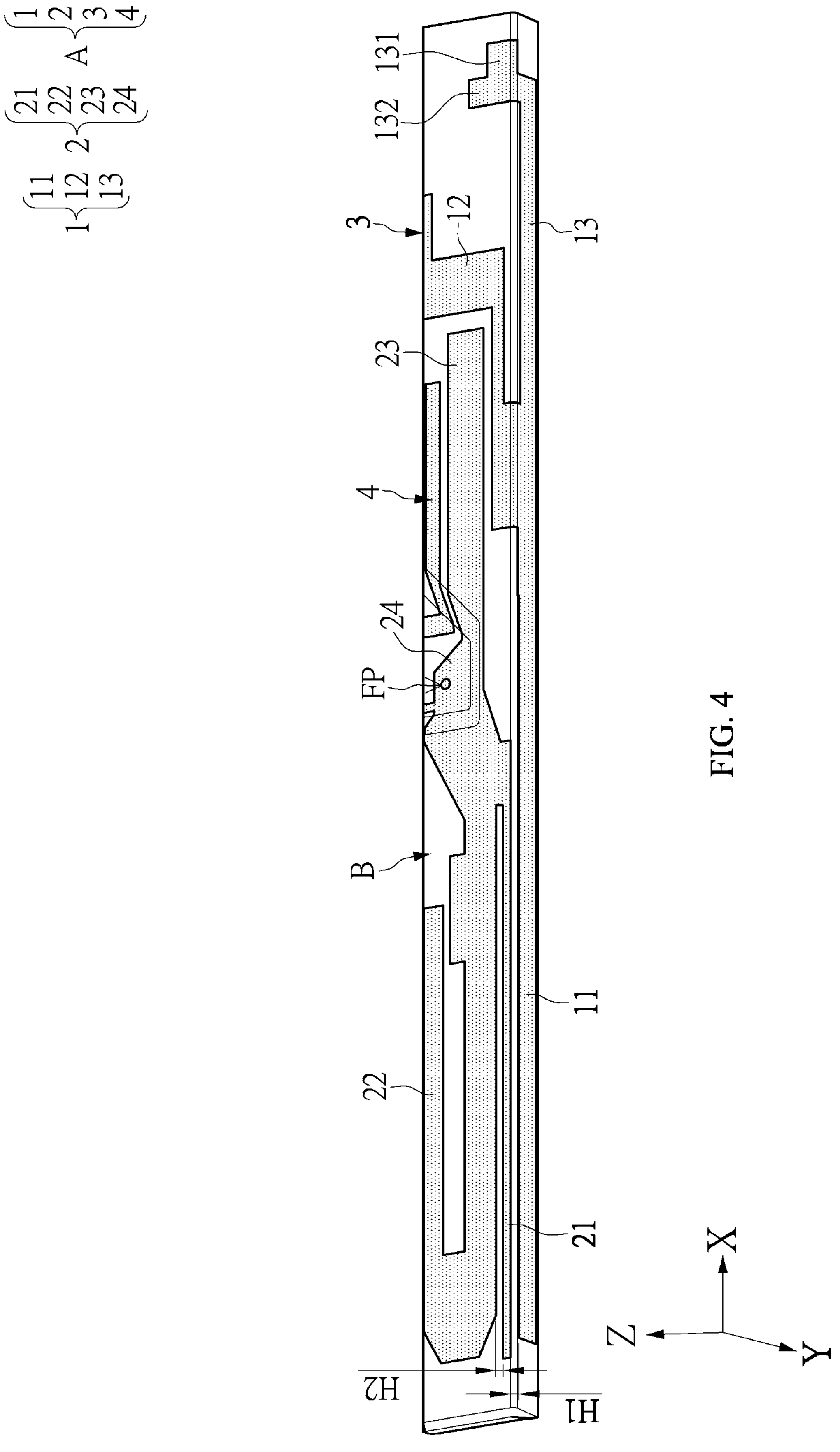
FIG. 4 is a schematic view of the antenna structure in the second embodiment of the present disclosure.

Next, referring to FIG. 4 and FIG. 5, FIG. 4 and FIG. 5 are three-dimensional schematic diagrams of the antenna structure in different viewing angles according to the second embodiment of the present disclosure. Comparing FIG. 3 with FIGS. 4 and 5, it can be seen that the appearance of the antenna structure A of the present disclosure is not limited, and may be changed according to the type of the carrier board B carrying the antenna structure A. Referring to FIG. 3, the carrier board B is a flat structure, and its size is relatively large, so the antenna structure A can be displayed in a fully unfolded form when the antenna structure A is disposed on the carrier board B. As shown in FIG. 4 and FIG. 5, the carrier board B is a three-dimensional structure, its surface is not flat and the size is small (the size of the carrier board B in the Y-axis of FIG. 4 and FIG. 5 is obviously smaller than that of FIG. 3), so the overall size (specifically, the size in the Y-axis, as shown in FIG. 5) when the antenna structure A is disposed on the carrier board B is also smaller. In this way, the antenna structure A of the present disclosure can be reduced in size through a three-dimensional form, so that it may be advantageously installed in an electronic device with a narrow-frame screen. From another point of view, since the antenna structure A of the present disclosure can be reduced in size through a three-dimensional form, the electronic device D does not need to reserve too much accommodating space in the design of the screen frame, which is beneficial to the electronic device D for the narrow border design of the screen.

Figure 6:
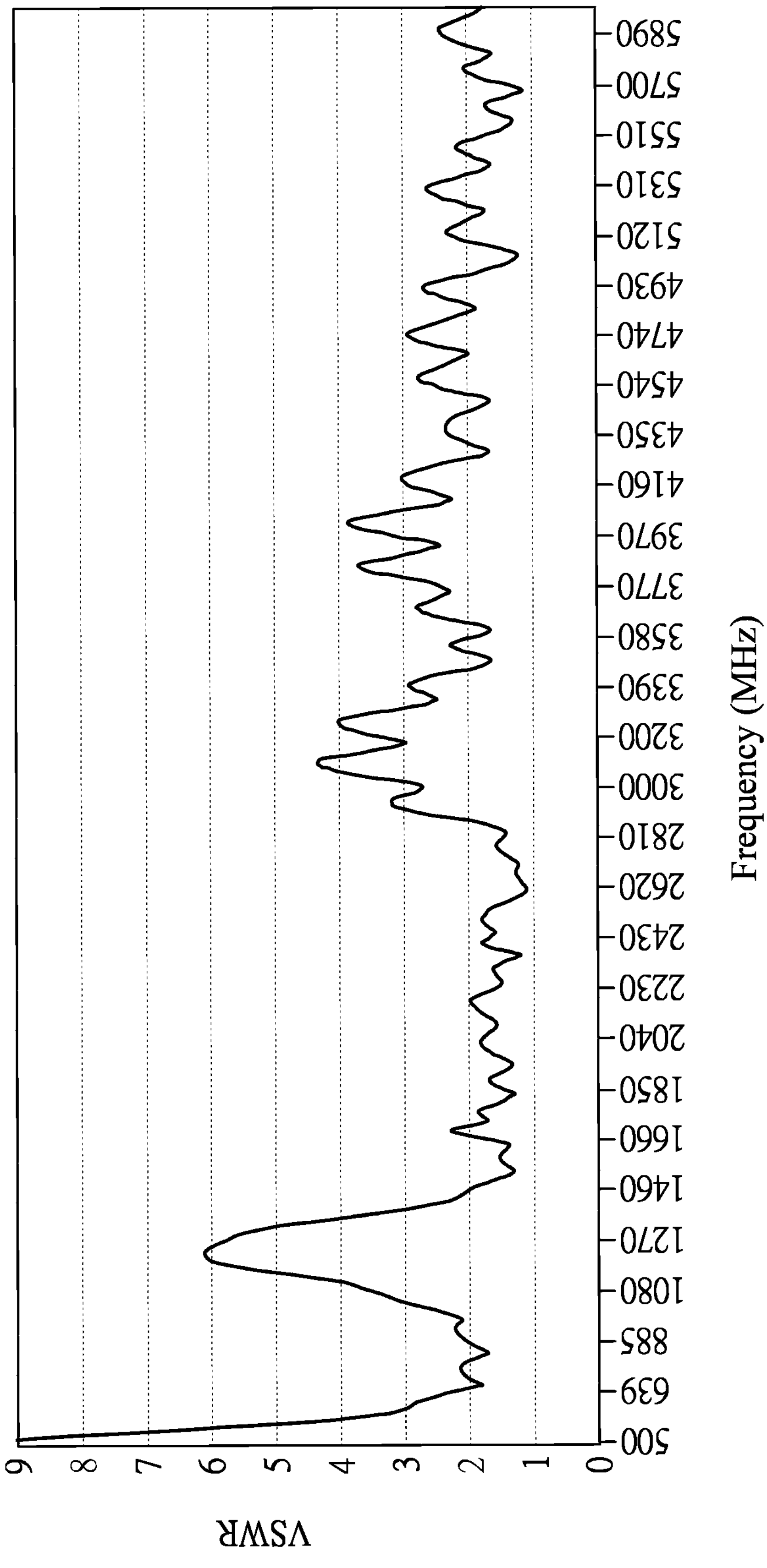
FIG. 6 is a diagram of the voltage standing wave ratio of the antenna structure of the present disclosure.

The antenna structure A of the first embodiment of the present disclosure may generate the first to the fifth operating frequency bands, while the antenna structure A of the second embodiment may generate the first to the ninth operating frequency bands. Next, referring to FIG. 6, FIG. 6 is a graph of the voltage standing wave ratio of the antenna structure of the present disclosure. Specifically, the frequency ranges of all frequency bands included in the present disclosure are (as shown in FIG. 6): the first operating frequency band covers the frequency range of 617 MHz to 698 MHz, and the second operating frequency band covers the frequency range of 698 MHz to 824 MHz, the third operating frequency band covers the frequency range from 824 MHz to 960 MHz, the fourth operating frequency band covers the frequency range 1427 MHz to 1610 MHz, the fifth operating frequency band covers the frequency range 1710 MHz to 2690 MHz, and the sixth operating frequency band covers the frequency range 1710 MHz The seventh operating frequency band covers the frequency range from 3300 MHz to 3800 MHz, the eighth operating frequency band covers the frequency range from 5150 MHz to 5925 MHz, and the ninth operating frequency band covers the frequency range from 4200 MHz to 5000 MHz.

Beneficial Effects of the Embodiments

One of the beneficial effects of the present disclosure is that the antenna structure A and the electronic device D provided by the present disclosure on the basis of being connected to one end of the grounding portion 12 through the first radiating portion 11, and the grounding element 3 being connected to another end of the grounding portion 12, so that first radiating portion 11, the grounding portion 12 and the grounding element 3 form a surrounding structure. In addition, on the basis of the second radiating portion 21 and the first radiating portion 11 being separate from and coupling to each other, so that the feeding portion 24, the second radiating portion 21, the first radiating portion 11 and the grounding portion 12 may generate a single-path dual resonance mode (the first operating frequency band and the second operating frequency band). Further, the third operating frequency band is generated by the coupling of the second radiating portion 21 and the third radiating portion 22 to cover the low frequency band.

Furthermore, a fifth radiating portion 13 is added to the first radiating element 1, a sixth radiating element 25 is added to the second radiating element 2, and a parasitic radiating portion 4 is added to the grounding element 3, to generate high frequency bands covering different operating bands. Thereby, the antenna structure A provided by the present disclosure cover both high and low frequency operations, and is suitable for mobile communication systems such as the third generation, the fourth generation, the fifth generation (including the Sub-6 frequency band) and the LTE full frequency band.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An antenna structure, comprising:

a first radiating element including a first radiating portion and a grounding portion, the first radiating portion connected to one end of the grounding portion;

a grounding element connected to another end of the grounding portion, wherein the first radiating portion, the grounding portion, and the grounding element form a surrounding structure; and a second radiating element including a second radiating portion, a third radiating portion, a fourth radiating portion, and a feeding portion connected between the second radiating portion, the third radiating portion and the fourth radiating portion, the feeding portion connected to a feeding element, and the second radiating portion disposed between the first radiating portion and the third radiating portion, wherein the second radiating portion extends in a direction away from the grounding portion relative to the feeding portion, the fourth radiating portion extends in a direction toward the grounding portion relative to the feeding portion, and the fourth radiating portion is surrounded by the surrounding structure;

wherein the second radiating portion and the first radiating portion are separate from and couple to each other, so that the feeding portion, the second radiating portion, the first radiating portion and the grounding portion generate a first operating frequency band and a second operating frequency band, and the first operating frequency band is different from the second operating frequency band;

wherein the second radiating portion and the third radiating portion couple to each other to generate a third operating frequency band, the third operating frequency band is higher than the second operating frequency band, and the second operating frequency band is higher than the first operating frequency band.

2. The antenna structure according to claim 1, wherein a first coupling gap is formed between the second radiating portion and the first radiating portion, and the first coupling gap is between 0.1 mm and 2 mm.

3. The antenna structure according to claim 2, wherein a second coupling gap is formed between the second radiating portion and the third radiating portion, and the second coupling gap is between 0.3 mm and 3 mm.

4. The antenna structure according to claim 1, wherein the second radiating portion is used to generate a fourth operating frequency band, the fourth radiating portion is used to generate a fifth operating frequency band, and the fifth operating frequency band is higher than the fourth operating frequency band.

5. The antenna structure according to claim 1, wherein the first radiating element further comprises a fifth radiating portion connected between the first radiating portion and the grounding portion, the fifth radiating portion includes a first branch and a second branch, the first branch extends along a first direction, the second branch extends along a second direction, and the first direction is perpendicular to the second direction; wherein the fifth radiating portion is used to generate a sixth operating frequency band and a seventh operating frequency band, the seventh operating frequency band is higher than the sixth operating frequency band, and the sixth operating frequency band overlaps the fifth operating frequency band.

6. The antenna structure according to claim 1, wherein the second radiating element further comprises a sixth radiating portion connected to the feeding portion, and the six radiating portion is used to generate an eighth operating frequency band.

7. The antenna structure according to claim 6, further comprising a parasitic radiating element connected to the grounding element, the parasitic radiating element and the fourth radiating portion being separate from and coupling to each other to generate a ninth operating frequency band, and the ninth operating frequency band being lower than the eighth operating frequency band.

8. The antenna structure according to claim 1, wherein the feeding element is connected to a feeding point of the feeding portion, and the grounding element includes a side edge close to the feeding portion.

9. An electronic device, comprising:

an antenna structure including:

a first radiating element including a first radiating portion and a grounding portion, the first radiating portion connected to one end of the grounding portion;

a grounding element connected to another end of the grounding portion, wherein the first radiating portion, the grounding portion, and the grounding element form a surrounding structure; and a second radiating element including a second radiating portion, a third radiating portion, a fourth radiating portion, and a feeding portion connected between the second radiating portion, the third radiating portion and the fourth radiating portion, the feeding portion connected to a feeding element, and the second radiating portion disposed between the first radiating portion and the third radiating portion, wherein the second radiating portion extends in a direction away from the grounding portion relative to the feeding portion, the fourth radiating portion extends in a direction toward the grounding portion relative to the feeding portion, and the fourth radiating portion is surrounded by the surrounding structure, and wherein the second radiating portion and the first radiating portion are separate from and couple to each other, so that the feeding portion, the second radiating portion, the first radiating portion and the grounding portion generate a first operating frequency band and a second operating frequency band, and the first operating frequency band is different from the second operating frequency band;

wherein a second coupling gap is formed between the second radiating portion and the third radiating portion, and the second coupling gap is between 0.3 mm and 3 mm, and a housing connected to the grounding element.

10. The electronic device according to claim 9, wherein the second radiating portion and the third radiating portion couple to each other to generate a third operating frequency band, the third operating frequency band is higher than the second operating frequency band, and the second operating frequency band is higher than the first operating frequency band.

11. The electronic device according to claim 9, wherein a first coupling gap is formed between the second radiating portion and the first radiating portion, and the first coupling gap is between 0.1 mm and 2 mm.

12. The electronic device according to claim 9, wherein the feeding element is connected to a feeding point of the feeding portion, and the grounding element includes a side edge close to the feeding portion.

* * * * *